(No Model.)
T. BRANTLEY.
VALVE FOR STEAM ENGINES.
No. 344,342. Patented June 29, 1886.
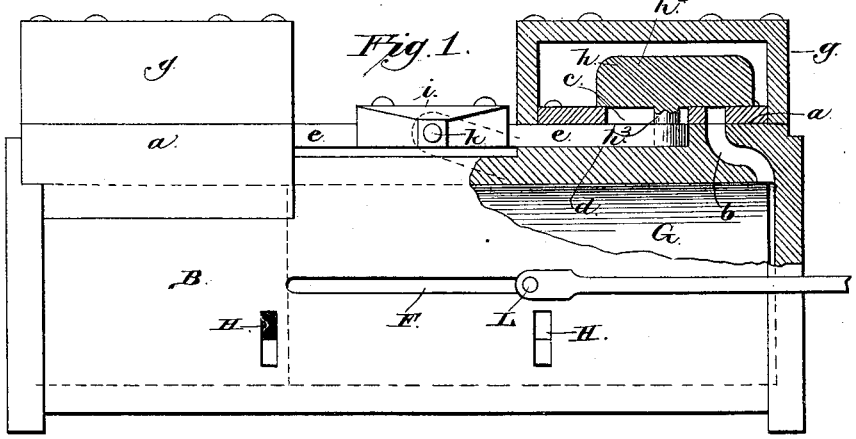
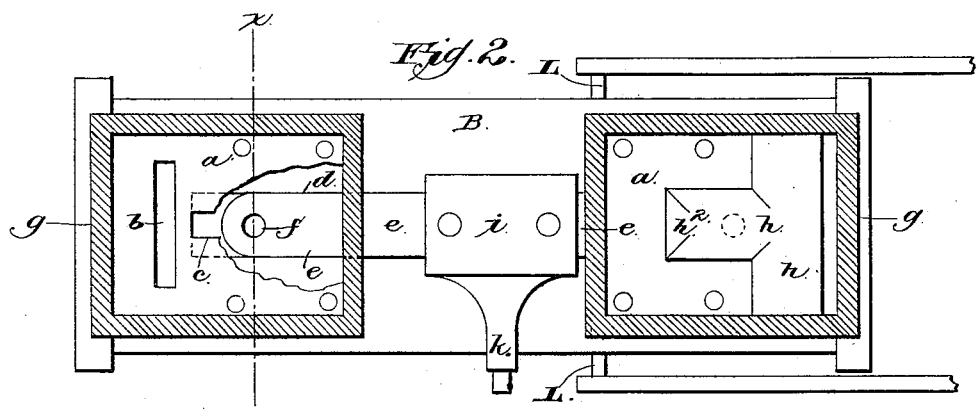
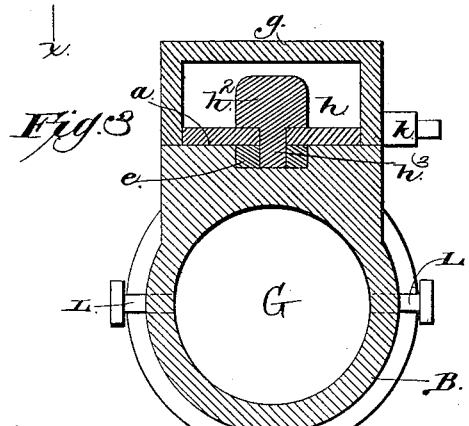
Witnesses
M. Fowler
J. W. Garner
Inventor
T. Brantley
By his Attorneys
C. A. Snowden

UNITED STATES PATENT OFFICE.

THOMAS BRANTLEY, OF EUFAULA, ALABAMA.

VALVE FOR STEAM-ENGINES.

SPECIFICATION forming part of Letters Patent No. 344,342, dated June 29, 1886.

Application filed April 30, 1886. Serial No. 200,701. (No model.)

*To all whom it may concern:*

Be it known that I, THOMAS BRANTLEY, a citizen of the United States, residing at Eufaula, in the county of Barbour and State of Alabama, have invented a new and useful Improvement in Cut-Off Valves for Steam-Engines, of which the following is a specification.

My invention relates to an improvement in cut-off valves for steam-engines; and it consists in the peculiar construction and combination of devices, that will be more fully set forth hereinafter, and particularly pointed out in the claims.

In the drawings, Figure 1 is an elevation, partly in section, of a steam-engine cylinder and steam-chests provided with cut-off valves embodying my improvements. Fig. 2 is a top plan view of the same, partly in horizontal section, with one of the valves removed. Fig. 3 is a vertical transverse sectional view taken on the line $x\,x$ of Fig. 2.

This invention is an improvement upon that for which Letters Patent of the United States No. 325,725 were granted to me September 8, 1885.

B represents a cylinder, in the sides of which are cut horizontal slots F, and in the cylinder is placed a piston, G, that is of sufficient length to keep the slots F closed at every portion of its stroke, so as to prevent the escape of steam through the said slots. This piston is packed steam-tight in the cylinder in any suitable manner, and in one side of the cylinder are cut the exhaust-openings H, which are located just beyond each end of the stroke of the piston.

On the upper side of the cylinder, at the ends thereof, are formed valve-seats $a$, through the outer ends of which extend transverse vertical inlet-ports $b$. Longitudinal slots $c$ are made on the upper faces of the valve-seats, at the centers thereof, the said slots being of a suitable length to correspond with the length of the stroke of the valve-rod. Longitudinal recesses $d$ are also made in the valve-seats, which extend from the inner ends of the said valve-seats nearly to the inlet-ports $b$.

$e$ represents the valve-rod, the ends of which fit in the longitudinal recesses $d$ in the valve-seats, and work therein. This valve-rod is provided at its extremities with vertical openings $f$, which register with the slots $c$ of the valve-seats, and move back and forth under the said slots when the valve-rod is reciprocated.

$g$ represents steam-chests, which are bolted on the upper sides of the valve-seats. The said steam-chests form rectangular boxes, which may be cast in a single piece, and thus very cheaply manufactured.

$h$ represents T-shaped slide-valves, provided with transverse heads $h'$ and longitudinal central arms, $h^2$. From the under sides of the arms $h^2$ depend studs $h^3$, which pass downwardly through the slots $c$ and enter the openings $f$ in the ends of the valve-rod, thereby connecting the slide-valves to the said rod, and thus causing the said valves to reciprocate therewith. The heads of the valves are adapted to alternately open and close the inlet-ports $b$ when the valve-rod is reciprocated, thereby alternately admitting the steam to the ends of the cylinder, and causing it to reciprocate the piston therein, as will be very readily understood.

The piston is provided with projecting trunnions or studs L, which extend out through the slots F in the sides of the cylinder, thus forming means for the attachment of pitman-rods or side arms, as described in my before-mentioned patent.

The valve-rod $e$ is provided at its center with an enlarged head, $i$, provided with a laterally-projecting pin, $k$, for the attachment of the usual eccentric-rod.

From the foregoing description it will be readily understood that the motion of the eccentric can be communicated to the valves without the use of a stuffing-box, and thus the friction due to the packing in a stuffing-box is avoided, and also the trouble and expense involved in keeping the stuffing-box properly packed. The pressure of the steam on the upper sides of the valves causes them to bear firmly on the upper sides of the valve-seats. As the valve-rod enters the valve-seats below the lower edges of the steam-chests, the latter may be unbolted and removed from the cylinder or placed thereon without disturbing the valves or any of their connections.

A steam-engine thus constructed is cheap and simple, is strong and durable, requires very slight attention, and is not likely to get out of order.

I do not desire to limit myself to the precise construction hereinbefore described, as it is evident that modifications may be made therein without departing from the spirit of my invention, the essential feature of which is a valve seat or seats having the recesses $d$ for the valve-rod, and the longitudinal slots $c$, and the valve bearing on the valve-seat, and having the depending studs $h^3$ extending through the slots $c$, and entering openings formed in the valve-rod.

Having thus described my invention, I claim—

1. The combination of the steam-chest having the valve-seat provided with the recess $d$ below the face of the valve-seat, and the longitudinal slot $c$ in the face of the valve-seat, and communicating with the recess $d$, the valve bearing on the face of the valve-seat, the valve-rod in the recess, and the pin or stud connecting the said rod and valve, and working in the slot $c$, substantially as described.

2. The combination, in a steam-engine, of the valve-seat, the steam-chest secured thereon, the valve-rod entering the valve-seat under the edge of the steam-chest, and the valve attached to the valve-rod, whereby the steam-chest may be removed without disturbing the valve or its connection, substantially as described.

3. The combination of the cylinder having the valve-seats at its ends, the recesses $d$ below the faces of the valve-seats, the longitudinal slots $c$ in the faces of the valve-seats, and communicating with the recesses $d$, the inlet-ports $b$ at the ends of the cylinder, and the exhaust-port F, with the piston in the cylinder, the reciprocating valve-rod having its ends bearing in the recesses $d$, the slide-valves bearing on the faces of the valve-seats, the studs or pins in the slots $c$, connecting the valves with the valve-rod, and the steam-chests secured on the valve-seats above the valve-rod, whereby the said steam-chests may be removed without disturbing the valve-rod or its connections, substantially as described.

In testimony that I claim the foregoing as my own I have hereto affixed my signature in presence of two witnesses.

THOMAS BRANTLEY.

Witnesses:
S. H. DENT,
H. A. YOUNG.